Feb. 3, 1970  H. J. STAAL  3,492,725
APPARATUS FOR FORMING CURDLED MILK INTO SMALL BLOCKS
Filed Aug. 11, 1967
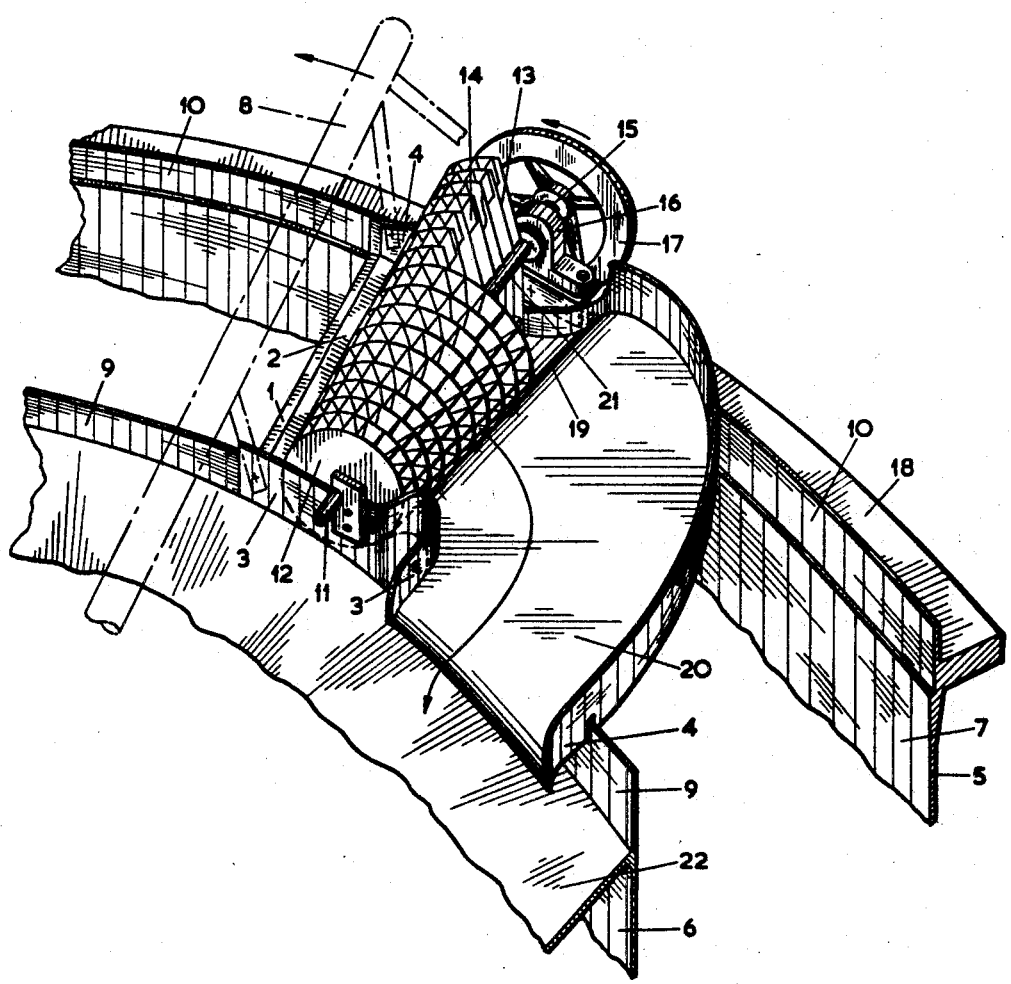
INVENTOR
HERMANNES JAN STAAL
BY *Stevens, Davis, Miller & Mosher*
ATTORNEYS United States Patent Office 3,492,725
Patented Feb. 3, 1970

3,492,725
APPARATUS FOR FORMING CURDLED MILK
INTO SMALL BLOCKS
Hermannes Jan Staal, Ede, Netherlands, assignor to Bedrijven Van Het Nederlands Instituut Voor, Zuivelonderzoek, Ede, Netherlands
Filed Aug. 11, 1967, Ser. No. 659,976
Claims priority, application Netherlands, Aug. 11, 1966, 6611326
Int. Cl. A01j 25/06
U.S. Cl. 31—48                                8 Claims

ABSTRACT OF THE DISCLOSURE

An apparatus for forming curdled milk into small blocks comprising a substantially horizontal guiding surface, the front edge of which is in the form of a cutting edge. Means are provided for guiding the curdled milk over this guiding surface along with a system of cutting blades located adjacent the guiding surface. One portion of the blades extends perpendicular to another portion thereof, and the bades are driven downwardly towards and upwardly away from the guiding surface to form the curdled milk into small blocks.

BACKGROUND OF THE INVENTION

Field of the invention

The invention relates to an apparatus for forming curdled milk into small blocks, and in particular, to such an apparatus utilizing knife edges extending substantially perpendicular to each other.

Prior art

During the preparation of many types of cheese, the milk, which has curdled under the influence of enzymes or acids, is cut in order to promote a desirable rapid exit of whey from the curd. This is usually done by causing a cutting mechanism to move in a vessel or tank containing milk which has been curdled therein.

Methods of cheese making are generally known in which milk is curdled in a continuous flow and, after a certain firmness (cohering denseness) has been obtained, is divided into more or less uniform blocks of curd. For example, this is taught in United States Patents 2,781,269; 2,908,575; 2,917,827; and 3,210,845.

In the above U.S. patents, an apparatus is taught which comprises a network of intersecting wires, bars or the like, provided at right angles to the direction of the stream of curdled milk, which network divides the curdled milk into a large number of strips which are subsequently divided into blocks by a rotating cutter placed behind and parallel to the network.

The above-mentioned Patent 3,210,845 to Radema et al. describes an apparatus by means of which a ribbon is cut from a stream of curdled milk flowing in an annular space, which ribbon is further divided into strips which are guided by an upright edge of the cutting mechanism in such a way that they are divided into blocks of equal volumes by a number of knife blades which are stationary on the edge of the annular curdling space.

These known arrangements involve various disadvantages. For example, the apparatus taught by the above-mentioned patents may be hampered in their proper operation due to the fact that milk constituents adhere to the wires, or the like, of the cutting network. This may ultimately lead to irregular passage and damage of the curdled milk, clogging of the cutting network, and infection of the milk.

These disadvantages are substantially eliminated by means of the cutting mechanism according to the U.S. Patent 3,210,845. However, the small blocks that are obtained do not all have the same form, a fact which hinders a uniform separation of the whey from the curd. Also, in this patent it is impossible to make the blocks relatively small, when compared to other similar devices.

SUMMARY OF THE INVENTION

It is the object of the invention to provide an apparatus which can provide blocks having not only the same volume, but also the same form and size, which size may be smaller than that possible utilizing known apparatus.

It is a further object of the present invention to provide an apparatus which can be easily checked and cleaned, and which will minimize any fouling of the cutting mechanism.

Briefly summarized, the apparatus of the present invention provides a guiding surface, at least a portion of which is substantially horizontal, and the front edge of which forms a cutting edge. Means are also provided for guiding the curdled milk over this guiding surface, along with a system of cutting edges or blades which can be moved towards and away from the guiding surface.

By means of the cutting edge, a uniformly thick ribbon or slice can be cut from the curdled milk, which ribbon or slice is then divided into uniformly sized blocks by the cutting edges or blades. The apparatus may be mounted above the surface of the curdled milk in such a manner that it can be checked by visual means, and can be easily cleaned, even during cheese making.

BRIEF DESCRIPTION OF THE DRAWINGS

The invention will now be described further with reference to the annexed drawing, which illustrates, in perspective and partially broken, an apparatus according to the invention in a preferred embodiment.

DESCRIPTION OF THE PREFERRED EMBODIMENTS

As specifically shown in the drawing, a horizontal cutting edge 1 is provided which forms the front edge of a substantially horizontal portion of a guiding surface 2 having upright edges 3 and 4 and being adapted to rotate by means of frame members 8 which are shown in part by dotted and dashed lines. The guiding and cutting unit rotates with respect to a cylindrical vessel 5 around a vertical axis not shown, but located approximately in the lower left-hand part of the drawing. The milk to be treated is curdled in vessel 5 and, during the curdling process, flows continuously upwards. The curdling space 7 in this vessel 5 may be annular, in which case it is bounded internally by a cylindrical wall 9 which is fixed to the guiding and cutting unit to rotate therewith.

Frame members 8 may be driven, for example, by means of a motor from above via a vertical shaft, which is placed centrally in relation to the curdling space or, if desired, from the radial outside of the curdling space.

The guiding and cutting unit may be secured only to the frame members 8 which is rotatable about the central shaft, so as to be suspended from this frame 8, or may be supported on edge 10 and on an outwardly extending flange 18, as well as on the stationary cone 22 and cylinder 6 during the movement over the curdling space. The stationary edge 10 and the rotating cylindrical wall 9 prevent the curdled milk flowing continuously upwards from immediately leaving the curdling space prematurely. When the guiding surface 2 is supported on edge 10 and flange 18 there may be a sliding contact, or supporting rollers or the like may be provided, as will be discussed in detail later.

The upright edges 3 and 4 of the guiding surface 2 supports a fixed hollow shaft 11 about which is fitted a body 12 with a conical outer surface. This body consists of a plurality of parallel plates 13, which may be flat or conical, and which have an apex which is supplemental to the apex of the body 12. Plates 13 are connected at their outer edges by radial partitions 14 which extend parallel to the hollow shaft 11. Both the plates 13 and the partitions 14 end in the same conical outer boundary surface of the body 12, and are relatively thin near their outer edges so that they can cut the curdled milk satisfactorily.

The system of plates 13 and partions 14 is rigidly connected to a short hollow stub shaft 15, which fits rotatably about the stationary shaft 11, rotatably supported in a bearing 16 on the upright edge 4 of the guiding surface 2 and, near its outer end, carries a friction wheel 17 rigidly fitted thereon. This wheel 17 rests on the flange 18 projecting annularly in relation to the curdling space at the top of the outer wall of the vessel 5, and at the bottom of the upright edge 10 of the curdling space.

The guiding surface 2 has a substantially horizontal portion, and the slope of the hollow shaft 11 is such that the conical body 12 lies with its lowest part closely above and almost in contact with the horizontal part of this guiding surface 2 throughout the length of body 12. Immediately beyond this lowest part of the conical body 12 the guiding surface 2 slopes upwardly, following the curved outer surface of the body 12 for a short distance, after which it deflects smoothly away from the curved surface of the rotary body, so that a threshold 19 is formed. From threshold 19 the guiding surface slopes downwardly and inwardly as shown at 20 ending via a lowered part inwardly of the cylindrical wall 9, which is rigidly secured to the guiding surface and rotates along with it the space within the cylindrical inner wall 6. The upright edges 3 and 4 also extend along this portion 20 thereby forming a generally trough-shaped surface.

Between the plates 13 the hollow shaft 11 is provided with orifices 21, directed towards the periphery of the body 12 at a short distance above the threshold 19.

It should be understood that a suitable guiding structure for discharging the cut curdled milk is present within the cylinder 6 in the interior of the curdling space. A portion of this structure is designated by 22, and leads to a device for the further processing of the curdled milk.

The apparatus operates as follows. The unit consisting of the guiding surface 2 and the rotary body 12 and the parts connected therewith is rotated about the vertical central shaft of the curdling space with wheel 17 traveling over the flange 18. The cheese making process is controlled in such a way that the milk is curdled as it flows upward in the curdling space 7, and reaches a level slightly higher than the guiding surface 2. Since the guiding surface 2 with the cutting edge 1 is moving with respect to cylinder 5, the cutting edge 1 cuts up to the upper layer of the curdled milk, this upper layer then being pushed onto the guiding surface 2.

The cut-off layer now comes into contact with the rotary body 12, whose circumferential speed is slightly greater throughout than the traveling speed of the guiding surface 2 in that place. This can, of course, be attained in a simple way by a suitable choice of a relatively small diameter of the friction wheel 17 in relation to the dimensions of the body 12.

During the rotation of body 12, the plates 13 and the partitions 14 cut the layer of curdled milk present on the guiding surface 2 into small blocks. Since the partitions 14 are equally spaced everywhere and all the plates 13 are at the same distances from each other, blocks of exactly the same dimensions are cut. Owing to the slightly greater speed of the body 12, those blocks of curdled milk are somewhat drawn apart, as a result of which they are readily detached from the rotary body 12 and thus become somewhat more rectangular in form than otherwise possible. Moreover, the curdled milk is positively transported to some extent by the rotary body 12, as a result of which no accumulations of curdled milk are formed in front of the body owing to the fact that the guiding surface and the rotary body form a type of propelling unit.

Of course, the relation between the cutting speed and the upward speed of the curdled milk can be regulated so that the cut rectangular blocks can take various shapes such as cubes, etc.

The cut-off blocks are taken along in the spaces between the plates 13 and the partitions 14, and are thus guided upwardly along the guiding surface to the threshold 19. There they slide away from and out of the rotary body and pass along this threshold to the descending part 20 of the guiding surface, thus sliding towards the interior of the curdling space, where they are discharged by the guide plate 22 and a suitable discharge, not shown in the drawing, towards a device for the further processing.

From the orifices 21 in the hollow shaft 11 is squirted a cleaning liquid, such as clean water, which is able to eject any particle or curdled milk that should be left in the rotary body 2 out of the latter. In addition, the ejected liquid keeps the rotary body clean, so that no undesirable impurities, accretions, and the like can form on the rotary body.

The advantages of the present invention are many. For example, it is possible to use a large number of thin plates 13 with thin partitions, so that very small blocks can be cut, all of which have exactly the same dimensions. As a result, a uniform discharge of whey from the curd is attained. The rotary body can always be checked by visual means, is easily kept clean in the way described above, and accordingly, cannot become clogged.

Even non-uniformly curdled milk, such as turned milk, can be cut by means of the apparatus of the present invention. Because the body 12 is rotated, a good cutting effect is obtained even when very small blocks are to be cut. This is in contrast to what might be the case with an apparatus according to the above-mentioned U.S. patents, where the blocks have to be forced through the knives and have to be removed from the apparatus exclusively by their own inertia and/or by the thrust of the layer of curdled milk following it.

Although a preferred form of the present invention has been described, it is to be understood that other variations are possible. For example, the blade may be constructed in the form of a flat frame of cutting edges or blades intersecting each other at right angles, and the frame can be suspended from a system of eccentrics or cranks with connecting rods, so that the system moves up and down substantially perpendicularly to and away from the guiding surface. In this arrangement, the stream of curdled milk flows in relation to the guiding surface which moves at such a rate with respect to the frequency of the up-and-down movement of the cutting system, that all the curdled milk is cut, which means that after its upward movement, the system moves down again so quickly that no uncut portion of the curdled milk has yet passed underneath the frame. The cutting system can then be moved rapidly, but may be present above the surface of the curdled milk during a fairly long period in proportion to the time during which the cutting edges are in the curdled milk, so that the continued horizontal flow of the curdled milk over the guiding surface does not stagnate owing to the cutting operation.

In this alternative form, it is better to give the cutting system approximately the same horizontal component of motion as the curdled milk above the guiding surface, in addition to the movement towards and away from the guiding surface. This again is possible in a way known in principle by means of eccentrics or cranks and suitable rod systems to cause the system of cutting edges or blades, constructed in the form of a cutting frame, to perform a circular, elliptic, or oval movement in a vertical plane so that, when this system is close above the guiding surface, it has a component of motion in the same direction as the curdled milk flowing over the guiding surface. This can also be achieved by fitting the cutting edges or blades on a conveyor system of endless belts or chains, which, above the guiding surface, move with the lower part towards the guiding surface and along with the curdled milk, are then reversed upwardly and are returned in the upper part.

Of course, other variations of the specific construction and arrangement of this type device herein disclosed can be made by those skilled in the art without departing from the invention.

I claim:

1. An apparatus for forming curdled milk into small blocks comprising a guiding surface at least a portion of which is substantially horizontal, a front edge of said surface forming a cutting edge, means for guiding the curdled milk over this guiding surface, a system of cutting blades provided adjacent said guiding surface and having the form of a rotary body whose axis of rotation is placed approximately transversely to the direction of movement of the curdled milk over the guiding surface and whose direction of rotation is such that the cutting blades move immediately adjacent said guiding surface in the same direction as the curdled milk so that said system of blades penetrates into said curdled milk, one portion of said blades extending perpendicular to another portion thereof, drive means to move said blades downwardly towards and upwardly away from said guiding surface, and a curdling container in which the milk flows upwardly, and wherein said rotary body and said guiding surface are moved with respect to said curdling container, said container being arranged so that the curdled milk can flow away over the guiding surface to beyond the curdling container and can move continuously in a horizontal plane in a closed path over the curdling container.

2. An apparatus according to claim 1, wherein on the discharge side of the rotary body, viewed in the direction of the movement of the milk over the guiding surface, the guiding surface substantially follows the outer surface of the rotary body in an upward direction so as to form a threshold over which the curdled milk is guided by the rotary body.

3. An apparatus according to claim 1, wherein said drive means comprises a driving wheel operatively connected to said rotary body and disposed on a circular edge of said curdling container.

4. An apparatus according to claim 1, wherein the circumferential speed of said rotary body immediately above said guiding surface is slightly greater than the horizontal flowing speed of the oncoming curdled milk over said guiding surface.

5. An apparatus according to claim 1, wherein said rotary body is conical with the apex thereof in the vertical axis of rotation of the guiding surface and the rotary body over the free upper surface of the curdling container.

6. An apparatus according to claim 1, wherein the blades of said one portion each have sharp outer edges, the same axis, and extended parallel at equal distances to each other, and wherein the blades of said other portion are in the form of transverse partitions, located in axial planes near the outer surface between said blades, said partitions all having cutting outer edges at the same mutual distances.

7. An apparatus according to claim 1, further comprising liquid ejection means disposed adjacent said blades and a source of liquid under pressure connected to said ejection means whereby liquid is substantially continuously and uniformly sprayed over said blades to clean same.

8. An apparatus according to claim 1, wherein said rotary body has a hollow non-rotating shaft, in which a plurality of orifices are provided which are directed approximately towards the zone where the curdled milk leaves the rotary body, and further comprising means for supplying a cleaning liquid to said shaft for ejection therefrom.

References Cited

UNITED STATES PATENTS

| | | | |
|---|---|---|---|
| 466,048 | 12/1891 | Davis | 31—48 |
| 790,926 | 5/1905 | Schoenrock | 31—48 |
| 1,781,373 | 11/1930 | Derfus | 31—48 |
| 3,210,845 | 10/1965 | Radema et al. | 31—48 X |

HUGH R. CHAMBLEE, Primary Examiner